Feb. 16, 1937.  F. B. O'SHEA  2,071,272
GLARE SHIELD
Filed June 18, 1935
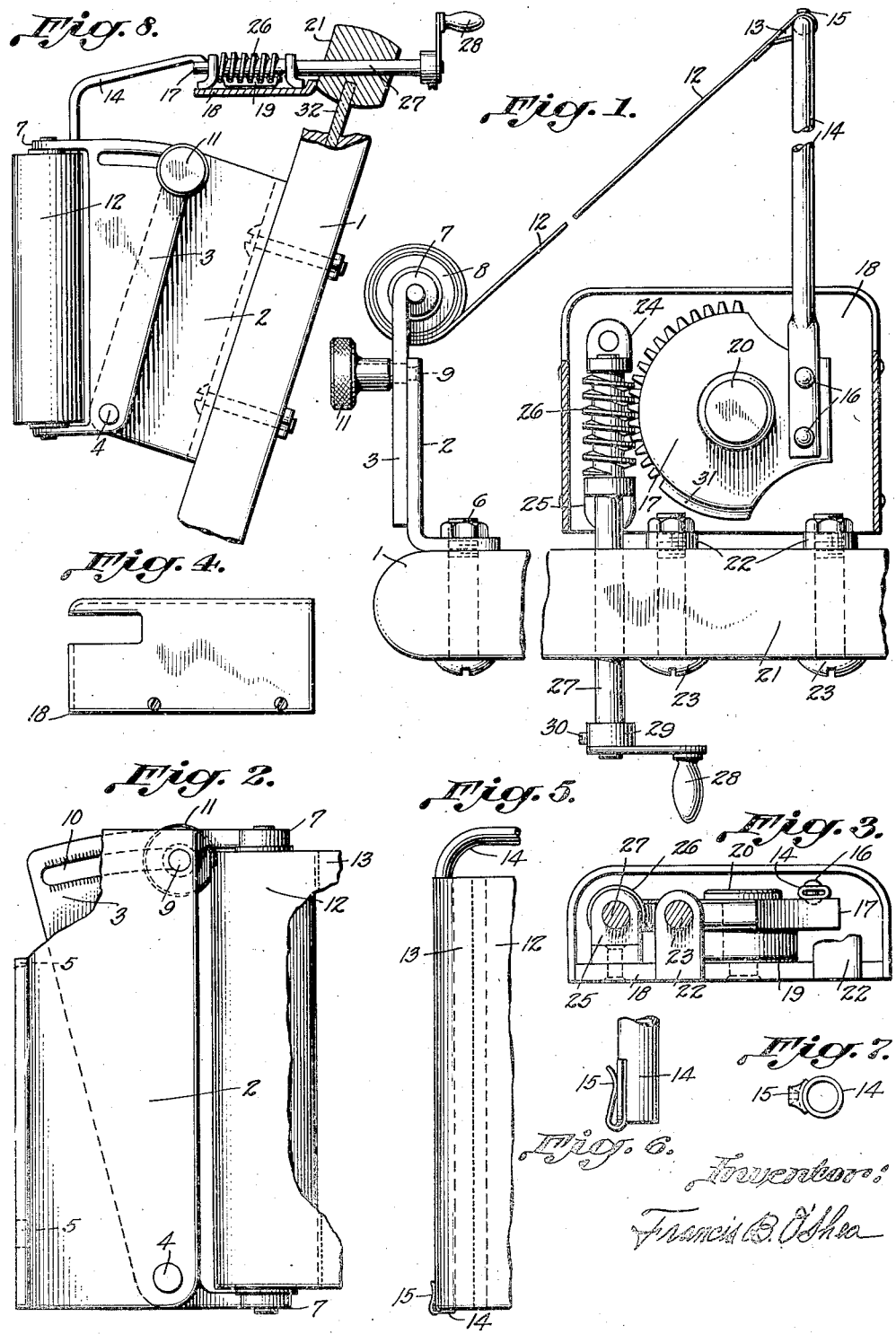
Inventor:
Francis B. O'Shea Patented Feb. 16, 1937

2,071,272

UNITED STATES PATENT OFFICE 2,071,272

GLARE SHIELD

Francis B. O'Shea, Ilion, N. Y., assignor of one-third to Sanford J. Getman, Ilion, N. Y.

Application June 18, 1935, Serial No. 27,156

2 Claims. (Cl. 296—97)

This invention relates to new and useful improvements in a glare shield for vehicles.

I have observed that when strong light, such as sunlight or the lights of an approaching vehicle, strikes a glass window, as the wind shield of an automobile, the window is rendered less transparent and when coated with a film of dust becomes at times almost opaque. Therefore:

The purposes of my present invention are to provide a glare shield which will not only shade the eyes of the driver from the glare of approaching headlights but will also cast a shadow on a section of the windshield through which the driver may clearly see objects ahead and to his right when passing other vehicles at night: which may be readily adjusted to and held at the desired position: which is of new and improved construction and operation and which is simple and economical in construction and durable and reliable in operation.

For a consideration of what I believe to be novel and my invention, attention is directed to the accompanying description and the claims appended thereto.

In the drawing annexed hereto and forming a part hereof,

Fig. 1 is a top view of the device, with cover removed, mounted upon a non-slanting windshield and showing the arm and shade in an extended position. The numeral 1 indicates the side member of the windshield frame to which the shade roller mounting bracket is fastened and the numeral 21 designates the top horizontal frame member upon which the arm and its actuating mechanism are mounted.

Fig. 2 is a side elevation of the shade roller mounting bracket.

Fig. 3 is a rear edge view of the arm actuating mechanism.

Fig. 4 is a side view of the arm actuating mechanism cover showing the opening to allow movement of the arm.

Fig. 5 shows how the shade is attached to the arm.

Fig. 6 shows the shade retaining clip.

Fig. 7 is an enlarged end view of the arm and clip.

Fig. 8 is a side elevation of the complete device mounted upon a slanting windshield, the arm and shade being in neutral position.

Referring to the drawing in a more particular description, the numeral 1 indicates the side member of a wind shield frame and mounted thereon is an adjustable bracket consisting of two sections 2, 3 which are conveniently made of metal and are pivoted together, as by rivet 4. Section 2 is of a somewhat rectangular shape and has its rearward edge bent to a ninety degree angle and is there provided with holes 5, 5 for the mounting bolts 6, 6. Section 3 is of a somewhat triangular shape and has its forward edge provided with lugs 7, 7 to hold the shade roller 8. On section 2 is a fixed bolt 9 which extends through a serrated slot 10 in section 3 and a thumb-nut 11 is screwed on the protruding end of the bolt. The spring roller 8 is of the ordinary construction. Wound on the roller 8 is a flexible shade 12 which is provided along its free edge with a hem 13 to receive the arm 14 which is hereinafter described.

It will now be seen that by loosening the thumb-nut 11 the shade roller 8 may be adjusted, to the desired vertical position, in relation to the wind shield, and also that the lateral rays of light from passing cars will be effectively prevented from reaching the shielded section of the wind shield.

Continuing the description of my device, the numeral 14 denotes a rigid arm, preferably of tubular construction and shaped so as to approximate the form of a right angle. Referring to the arm as being in its mounted position, its vertical section is inserted in the hem 13 of the shade 12. To prevent the shade from slipping off of the arm a clip 15 is provided at the lower end of the arm. The horizontal section of the arm has its end flattened and pierced so that the arm can be rigidly fastened, as by rivets 16, 16, to the toothed sector 17. The toothed sector 17 is pivotally mounted to a supporting plate 18 by means of the hub 19 and a stud 20. The supporting plate 18 is in turn rigidly fastened, to the top member 21 of the wind shield frame by means of upturned lugs 22, 22 and bolts 23, 23 at a point adjacent the center of the top member 21 and between the ends of the windshield. On the supporting plate 18 and in operative relation with the toothed sector 17 are rotatably mounted by means of bearings 24, 25, a worm 26, and shaft 27. The shaft 27 extends rearwardly through the wind shield top frame member 21 and is there provided with a detachable handle 28 which is fastened to the shaft by means of a collar 29 and set screw 30. On the toothed sector 17 is a blank section 31 which operates against the worm 26 to act as a stop. Upon its return the arm 14 contacts the bearing 24. The movement of the arm is thus limited to about three eighths of a revolution. The worm 26 is of such pitch that it cannot be reversely operated by the toothed sector 17.

In the drawing, Fig. 8 shows the shade roller mounting bracket fastened to the side member 1 of a slanting windshield frame and extended so as to adjust the roller 8 to the required upright position. In this view the top frame member 21 and the side member 1 are broken away to show the operating member 27 and the glass 32 of the windshield.

Assuming that the shield is in its neutral position, if the handle 28 is rotated in the proper direction the arm 14 will swing outwardly from the wind shield in a horizontal arc and thus draw out the shade 12 to the desired position where it will remain, held taut by the spring roller 8, until the handle is again turned. Rotating the handle in the opposite direction will, of course, swing the arm back toward the wind shield allowing the shade to be retired by the roller.

As the light of oncoming headlights strikes the wind shield from points to the driver's left, and as the shield is extended from the driver's left into the line of light and at a forward angle, it is obvious that there will be a resulting shadow cast on the wind shield and that this shadow will extend farther toward the driver's right than does the shield which produces it, and that this shadow will be governed by the character and position of the forward part of the shield. Thus, the driver will be enabled to clearly see objects to the right of his shield and in front of his car.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In an anti-headlight glare device the combination of a flexible band supported at one end by a spring roller, said roller being operatively mounted upon a bracket adapted to adjust the roller to an upright position and to cooperate with the flexible band in a light-shielding capacity, said bracket being fastened to the side member of a windshield frame, said flexible band being supported at its other end by a rigid L-shaped arm, said arm being pivotally mounted upon a horizontal member of the windshield frame and adapted to move in a horizontal arc forwardly of the windshield to extend the flexible band and to allow the band to be withdrawn, means for moving the arm as indicated and for sustaining the arm in the desired operative position, said means including a toothed rack, a worm, and manually operated means for rotating the worm.

2. In a structure for the purposes indicated a rigid L-shaped arm, said arm being pivotally mounted upon a horizontal member of a windshield frame and adapted to move in a horizontal arc forwardly of the windshield, means for moving the arm as indicated and for sustaining the arm in the desired operative position, a bracket mounted upon a side member of the windshield frame, said bracket being so constructed that, when mounted, its leading edge will be substantially parallel to the vertical section of the said arm, a flexible shade wound upon a yieldingly tensioned roller, said shade and roller being so mounted that upon movement of the arm in a horizontal plane the shade will be extended lengthwise between the arm and the bracket, before the windshield and at a horizontal angle thereto.

FRANCIS B. O'SHEA.